(12) United States Patent
Tseng

(10) Patent No.: US 8,182,114 B2
(45) Date of Patent: May 22, 2012

(54) DISPLAY AND ELECTRONIC DEVICE WITH DISPLAY

(75) Inventor: Tien-Chung Tseng, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 582 days.

(21) Appl. No.: 12/485,768

(22) Filed: Jun. 16, 2009

(65) Prior Publication Data

US 2010/0097807 A1 Apr. 22, 2010

(30) Foreign Application Priority Data

Oct. 22, 2008 (TW) ................................ 97140428 A

(51) Int. Cl.
 *F21S 8/00* (2006.01)
(52) U.S. Cl. ................ 362/277; 362/1; 362/2; 362/600; 362/602; 362/604
(58) Field of Classification Search .................. 362/1, 2, 362/600, 602, 604, 611, 632, 97.1, 806; 250/208.1, 250/221, 239; 345/175, 178, 18.09; 361/679
See application file for complete search history.

(56) References Cited

U.S. PATENT DOCUMENTS 7,760,185 B2 * 7/2010 Joung et al. ................... 345/166

* cited by examiner

*Primary Examiner* — Jong-Suk (James) Lee
*Assistant Examiner* — Mark Tsidulko

(57) ABSTRACT

A display. A casing includes an opening. A light guide plate is disposed in the casing. A display panel is disposed in the casing and is adjacent to the light guide plate. A light-guiding member is movably disposed in the opening and includes a first light-permeable portion, a second light-permeable portion, and at least one non-light-permeable portion. The first light-permeable portion is opposite the second light-permeable portion. The non-light-permeable portion is disposed between the first and second light-permeable portions. When the light-guiding member is moved to a first position, the second light-permeable portion connects to the light guide plate and light in the exterior of the casing enters the light guide plate via the first and second light-permeable portions. When the light-guiding member is moved to a second position, the non-light-permeable portion connects to the light guide plate and the light does not enter the light guide plate.

6 Claims, 6 Drawing Sheets

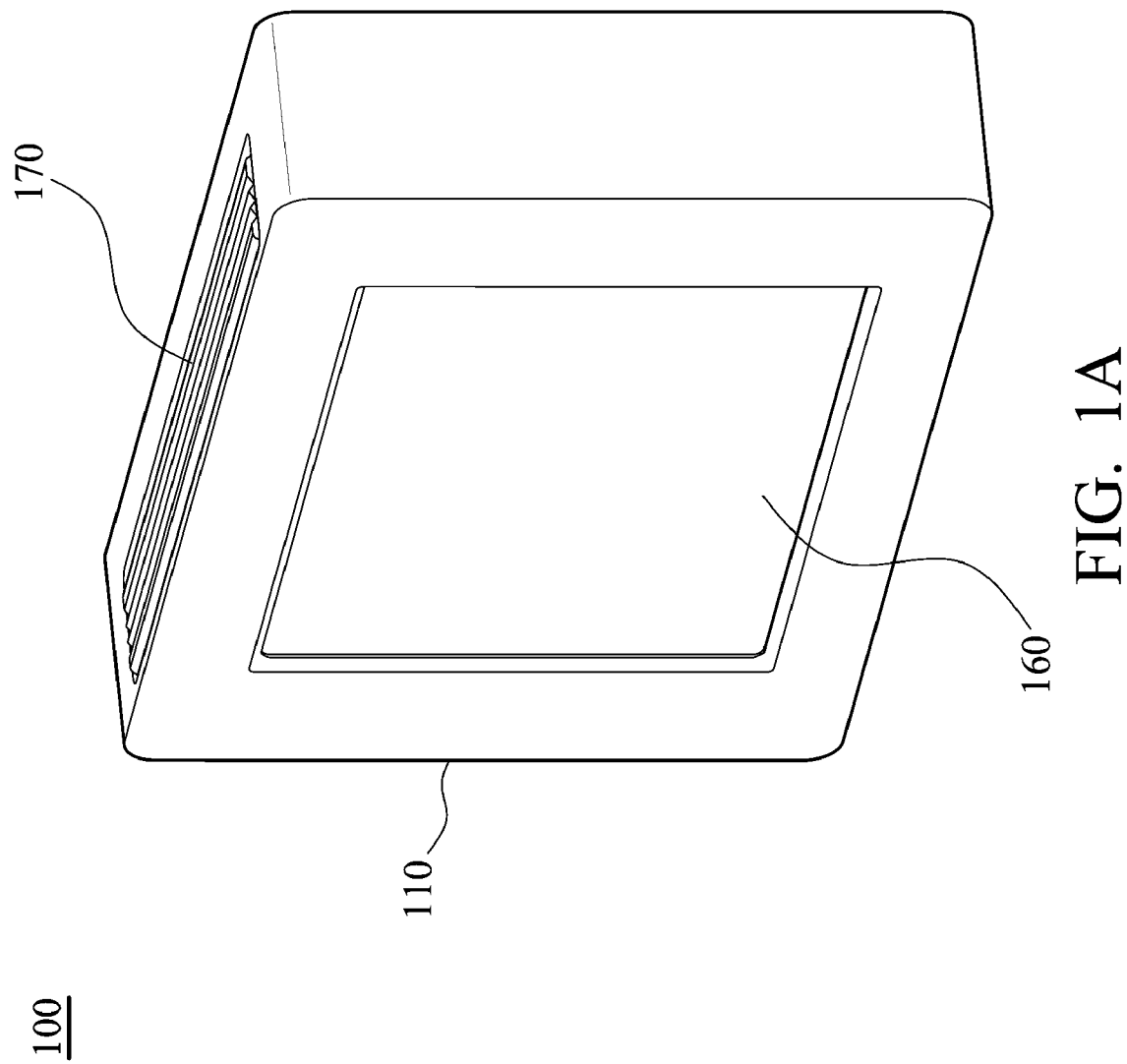

DISPLAY AND ELECTRONIC DEVICE WITH DISPLAY

CROSS REFERENCE TO RELATED APPLICATIONS

This Application claims priority of Taiwan Patent Application No. 097140428, filed on Oct. 22, 2008, the entirety of which is incorporated by reference herein.

BACKGROUND OF THE INVENTION

1. Field of the Invention

The invention relates to a display and an electronic device with a display, and more particularly to a display and an electronic device with a display providing reduced electrical power consumption.

2. Description of the Related Art

Generally, in a conventional liquid crystal display of a cellular phone, a personal digital assistant (PDA), a digital camera, or a global positioning system (GPS), a backlight module thereof employs active light sources, such as light-emitting diodes or cold cathode fluorescent lighting tubes, to provide a backlight effect. Here, light from the active light sources enters a light guide. After a series of reflection, scattering, and refraction of the light, the light is output to the exterior of the liquid crystal display via a liquid crystal panel, displaying images on the liquid crystal panel.

Nevertheless, the backlight module with the active light sources has some drawbacks. When the liquid crystal display is in a bright outdoor environment, the active light sources must output high-intensity light to resist blazing environmental light, enabling a user to clearly see the images displayed on the liquid crystal panel. Accordingly, the backlight module consumes enormous electrical power, thus not conforming to an energy-saving purpose. Alternatively, to compensate for the blazing environmental light, the number of the active light sources can be increased. However, manufacturing costs of the backlight module or liquid crystal display would also be increased.

Hence, there is a need for a display and an electronic device with a display that efficiently utilizes environmental light to clearly display images, reducing electrical power consumption and enhancing economic benefits.

BRIEF SUMMARY OF THE INVENTION

A detailed description is given in the following embodiments with reference to the accompanying drawings.

An exemplary embodiment of the invention provides a display comprising a casing, a light guide plate, a display panel, and a light-guiding member. The casing comprises an opening. The light guide plate is disposed in the casing. The display panel is disposed in the casing and is adjacent to the light guide plate. The light-guiding member is movably disposed in the opening of the casing and comprises a first light-permeable portion, a second light-permeable portion, and at least one non-light-permeable portion. The first light-permeable portion is opposite the second light-permeable portion. The non-light-permeable portion is disposed between the first and second light-permeable portions. When the light-guiding member is moved to a first position, the second light-permeable portion connects to the light guide plate and light in the exterior of the casing enters the light guide plate sequentially via the first and second light-permeable portions. When the light-guiding member is moved to a second position, the non-light-permeable portion connects to the light guide plate and the light in the exterior of the casing does not enter the light guide plate via the light-guiding member.

The non-light-permeable portion comprises a reflective material.

The casing further comprises a first positioning groove and a second positioning groove. The light-guiding member further comprises a positioning protrusion. The positioning protrusion is engaged in the first positioning groove when the light-guiding member is moved to the first position. The positioning protrusion is engaged in the second positioning groove when the light-guiding member is moved to the second position.

The display further comprises a light source disposed in the casing and adjacent to the light guide plate.

The display further comprises a support frame disposed in the casing and supporting the light guide plate.

The display further comprises a reflective film disposed between the light guide plate and the support frame.

BRIEF DESCRIPTION OF THE DRAWINGS

The invention can be more fully understood by reading the subsequent detailed description and examples with references made to the accompanying drawings, wherein:

FIG. 1A is a schematic perspective assembly view of a display of an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1B:
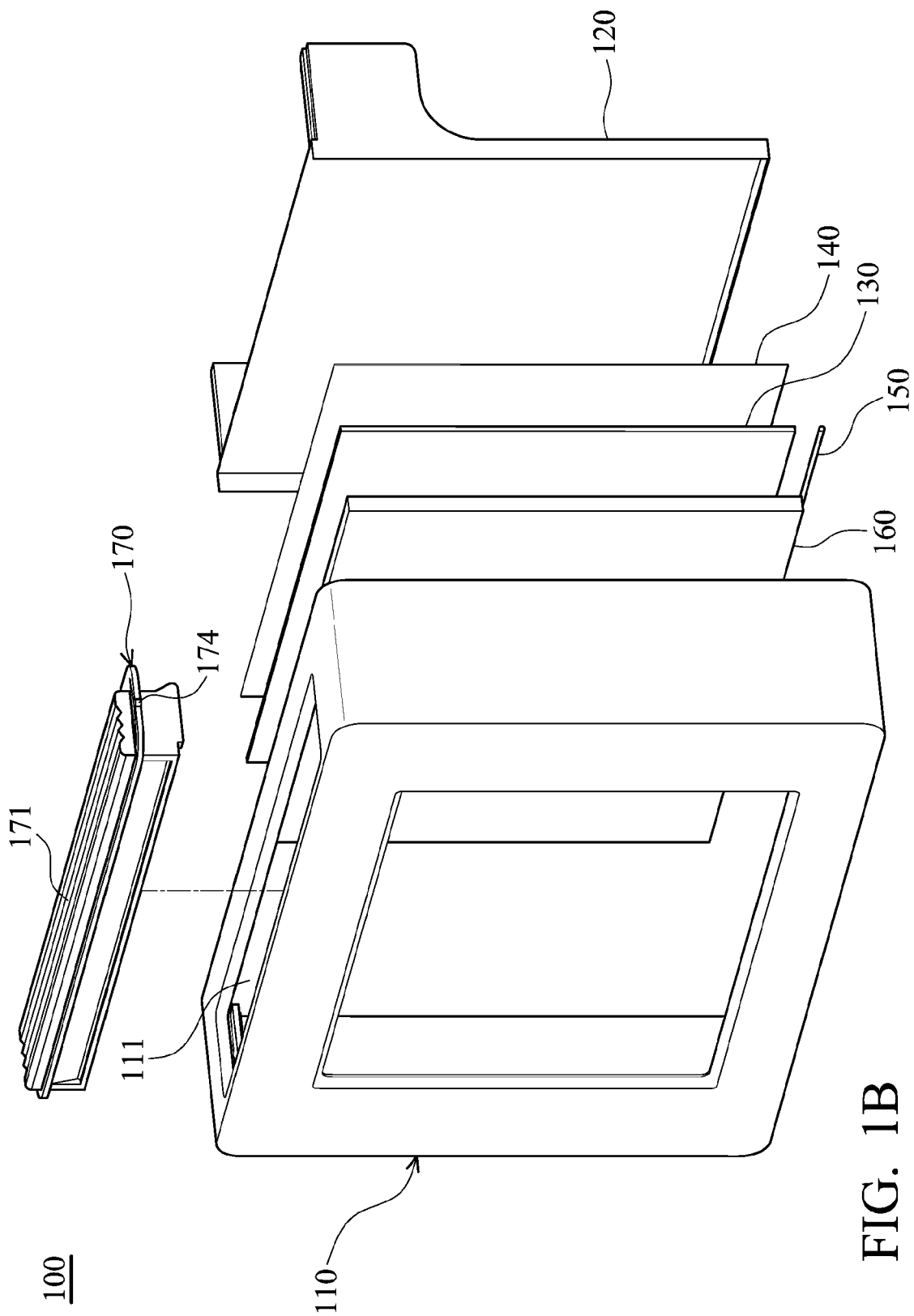
FIG. 1B is a schematic exploded perspective view of a display of an embodiment of the invention.

FIG. 1A is a schematic perspective assembly view of a display of an embodiment of the invention. FIG. 1B is a schematic exploded perspective view of a display of an embodiment of the invention. A display (or an electronic device with a display) 100 comprises a casing 110, a support frame 120, a light guide plate 130, a reflective film 140, a light source 150, a display panel 160, and a light-guiding member 170.

Figure 2A:
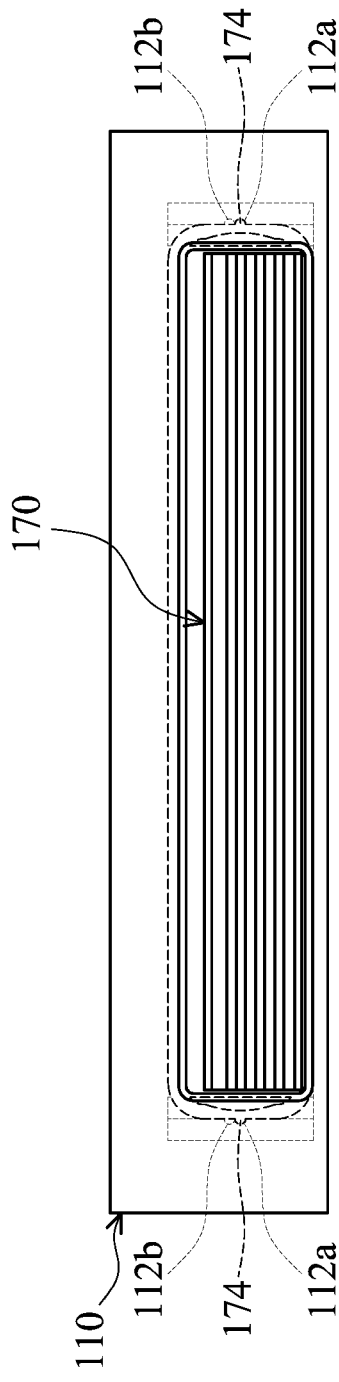
FIG. 2A is a schematic top view of a display of an embodiment of the invention in an operational mode.
Figure 2B:
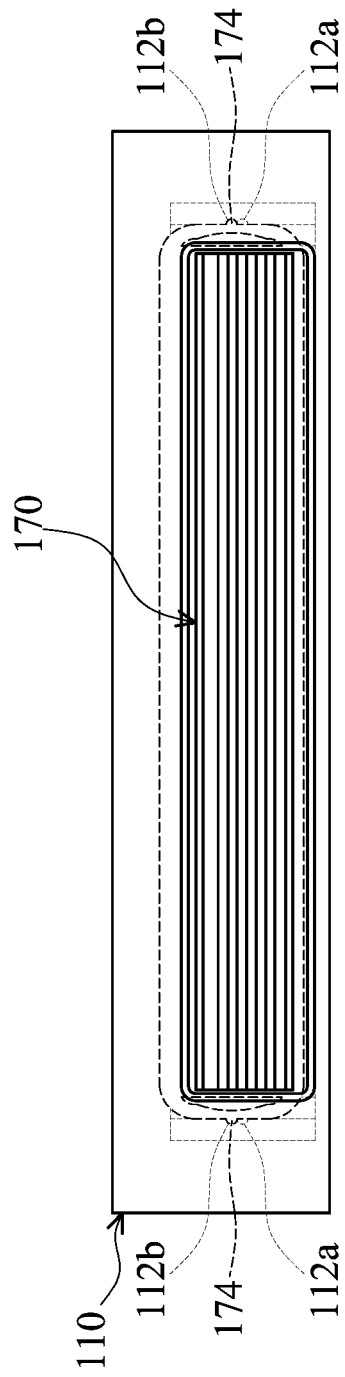
FIG. 2B is a schematic top view of a display of an embodiment of the invention in another operational mode.

FIG. 2A is a schematic top view of a display of an embodiment of the invention in an operational mode. FIG. 2B is a schematic top view of a display of an embodiment of the invention in another operational mode. As shown in FIGS. 1B, 2A, and 2B, the casing 110 comprises an opening 111, two opposite first positioning grooves 112a, and two opposite second positioning grooves 112b. Here, one first positioning groove 112a and one second positioning groove 112b are formed on one side of the opening 111, while the other first positioning groove 112a and the other second positioning groove 112b are formed on the other side of the opening 111.

As shown in FIG. 1B, the support frame 120 is disposed in the casing 110.

The light guide plate 130 is disposed in the casing 110 and is supported by the support frame 120.

The reflective film 140 is disposed between the light guide plate 130 and the support frame 120.

The light source 150 is disposed in the casing 110 and is adjacent to the light guide plate 130. Here, the light source 150, reflective film 140, light guide plate 130, and support frame 120 may be regarded as a backlight module of the display 100. Moreover, the light source 150 may be a cold cathode fluorescent lighting tube or a light-emitting diode.

The display panel 160 is disposed in the casing 110 and is adjacent to the light guide plate 130. Here, after entering the light guide plate 130, light from the light source 150 is transmitted to the exterior of the display 100 via the display panel 160 by reflection of the reflective film 140 and scattering and refraction in the light guide plate 130. Moreover, the display panel 160 may be an LCD panel or a plasma display panel.

Figure 3A:
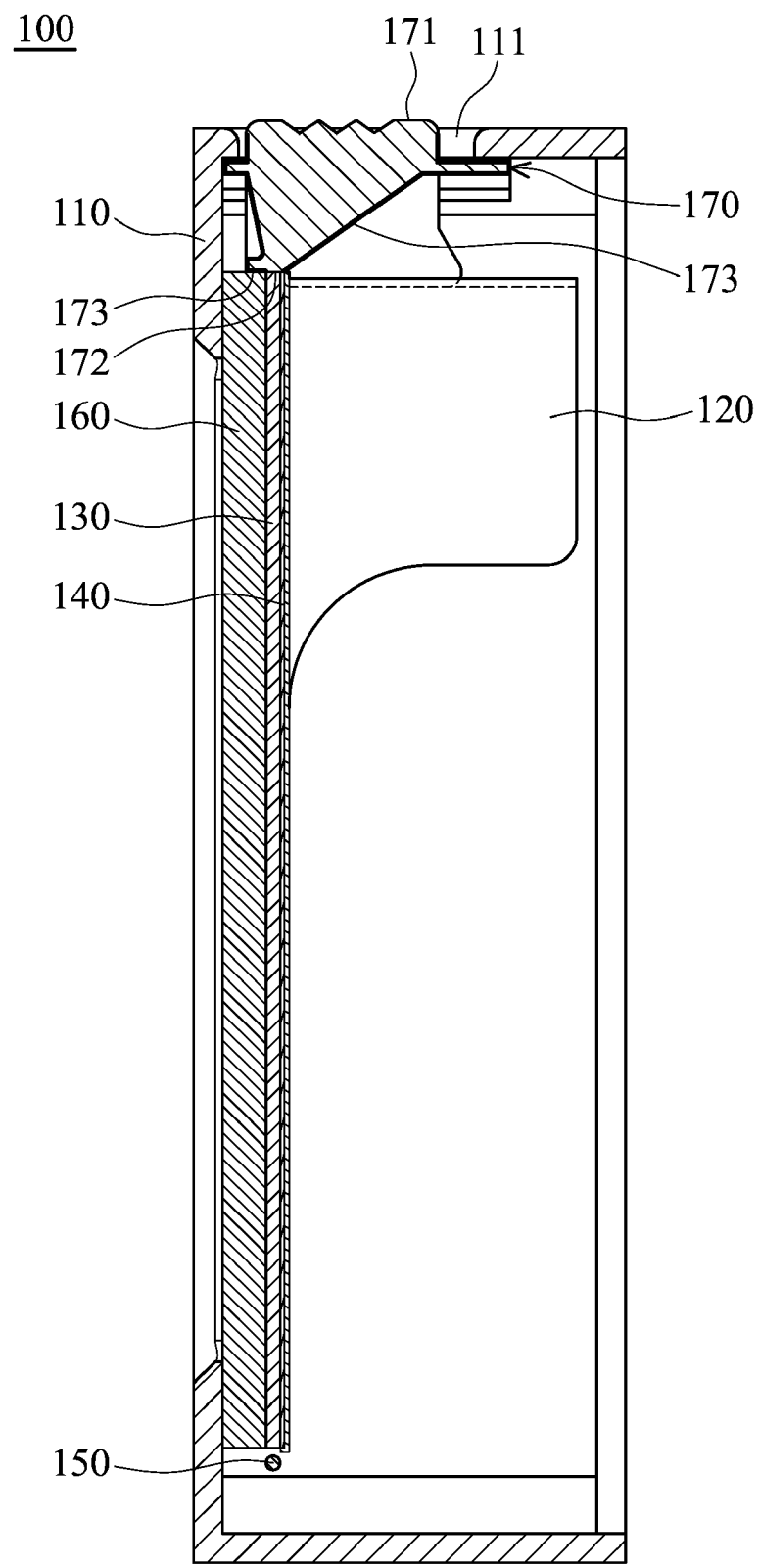
FIG. 3A is a schematic cross section of a display of an embodiment of the invention in an operational mode.
Figure 3B:
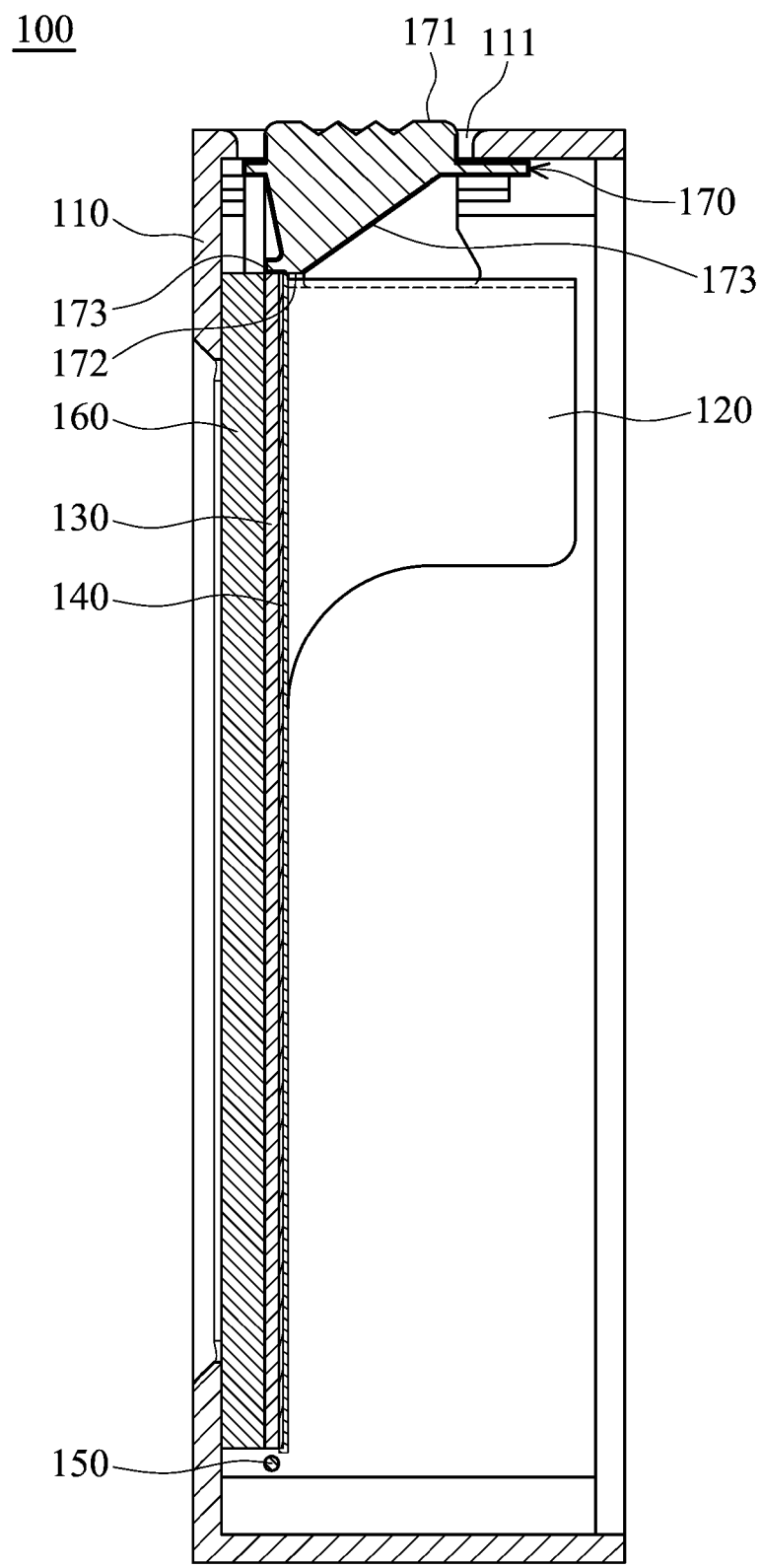
FIG. 3B is a schematic cross section of a display of an embodiment of the invention in another operational mode.
Figure 4:
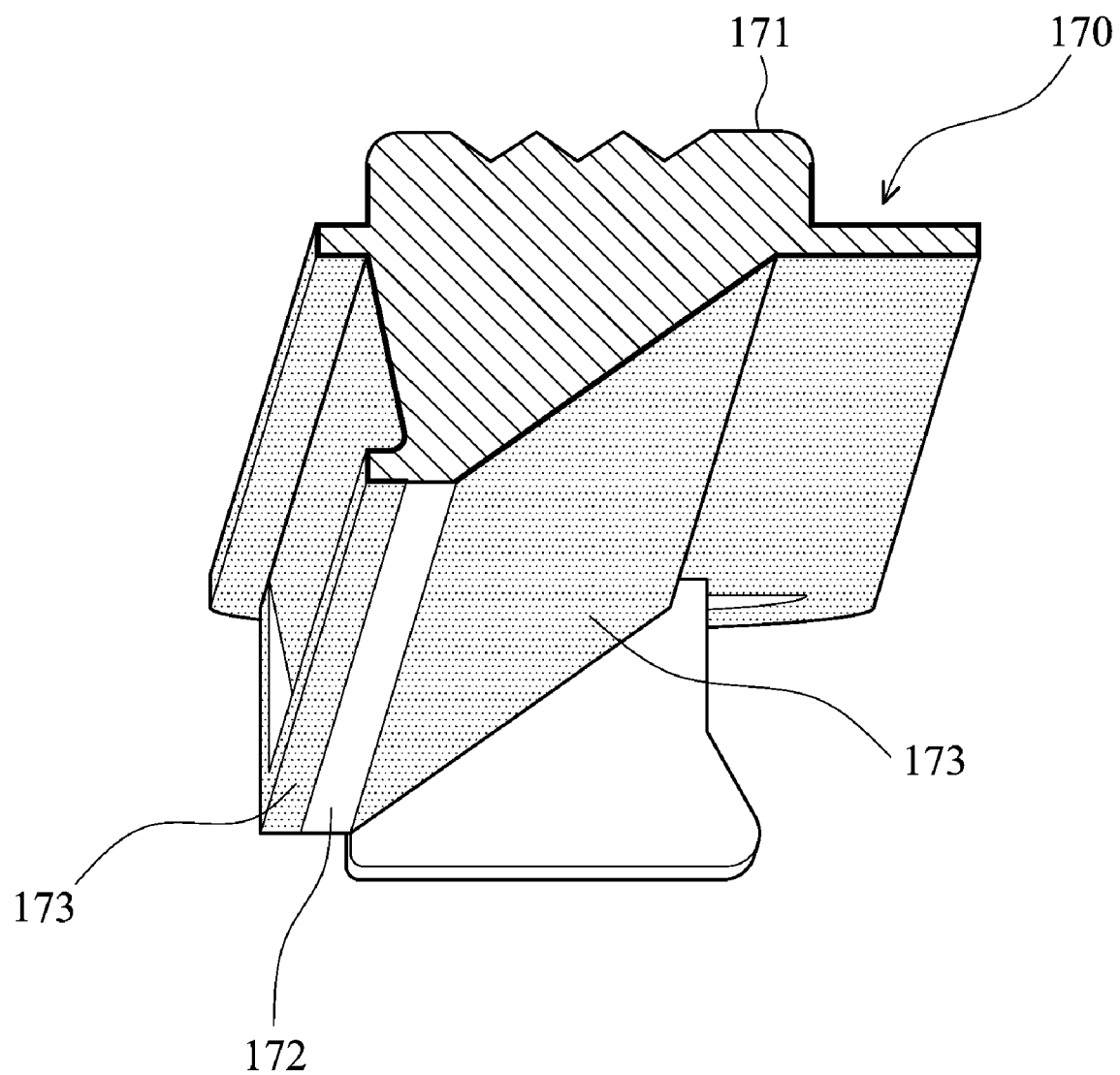
FIG. 4 is a schematic perspective cross section of a light-guiding member of a display of an embodiment of the invention.

FIG. 3A is a schematic cross section of a display of an embodiment of the invention in an operational mode. FIG. 3B is a schematic cross section of a display of an embodiment of the invention in another operational mode. FIG. 4 is a schematic perspective cross section of a light-guiding member of a display of an embodiment of the invention. As shown in FIGS. 1B, 2A, 2B, 3A, 3B, and 4, the light-guiding member 170 is movably disposed in the opening 111 of the casing 110 and comprises a first light-permeable portion 171, a second light-permeable portion 172, two non-light-permeable portions 173, and two opposite positioning protrusions 174. As shown in FIGS. 3A, 3B, and 4, the first light-permeable portion 171 is opposite the second light-permeable portion 172, and the non-light-permeable portions 173 are disposed between the first light-permeable portion 171 and the second light-permeable portion 172. As shown in FIG. 2A and FIG. 2B, the positioning protrusions 174 are selectively engaged in the first positioning grooves 112a or second positioning grooves 112b of the casing 110. Moreover, in this embodiment, the non-light-permeable portions 173 of the light-guiding member 170 are composed of a reflective material. Specifically, the light-guiding member 170 composed of the reflective material may be electroplated on the outer surface of the light-guiding member 170. Accordingly, the light entering the light-guiding member 170 can be reflected by the non-light-permeable portions 173 and cannot be transmitted to the exterior of the light-guiding member 170 via the non-light-permeable portions 173, thereby enhancing utilization of the light. Additionally, the (interior of the) light-guiding member 170 may be composed of a transparent material, such as glass or acrylic.

The following description is directed to operation of the display 100.

When the display 100 is in a bright environment (such as an outdoor place), the light-guiding member 170 can be moved to a first position, connecting the second light-permeable portion 172 to the light guide plate 130, as shown in FIG. 2A and FIG. 3A. At this point, the positioning protrusions 174 of the light-guiding member 170 are engaged in the first positioning grooves 112a of the casing 110, achieving an effect of positioning the light-guiding member 170 in the first position. Bright light in the exterior of the casing 110 can enter the light guide plate 130 sequentially via the first light-permeable portion 171 and second light-permeable portion 172 of the light-guiding member 170. At this point, the bright light and the light from the light source 150 can together be transmitted to the exterior of the display 100 via the display panel 160. Accordingly, without increasing the intensity of the light from the light source 150, a user can clearly see images displayed on the display panel 160 of the display 100.

In another aspect, when the display 100 is in a dark environment, the light-guiding member 170 can be moved to a second position, connecting one of the non-light-permeable portions 173 to the light guide plate 130, as shown in FIG. 2B and FIG. 3B. At this point, the positioning protrusions 174 of the light-guiding member 170 are engaged in the second positioning grooves 112b of the casing 110, achieving an effect of positioning the light-guiding member 170 in the second position. Accordingly, by obstruction of the non-light-permeable portion 173, the light in the exterior of the casing 110 cannot enter the light guide plate 130 via the light-guiding member 170. At the same time, because of the obstruction of the non-light-permeable portion 173, the light from the light source 150 cannot be transmitted to the exterior of the casing 110 via the light-guiding member 170.

In conclusion, as the disclosed display (or electronic device with a display) fully utilizes environmental light to clearly display images, electrical power consumption can be reduced, thereby conforming to an energy-saving purpose. Moreover, as the disclosed display (or electronic device with a display) fully utilizes environmental light to clearly display the images, the number of the light source can be reduced, thereby reducing manufacturing costs, and further enhancing economic benefits. Additionally, the disclosed electronic device may be a computer with a liquid crystal display or a plasma display, a personal digital assistant (PDA), or a cellular phone.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display, comprising:
   a casing with an opening;
   a light guide plate disposed in the casing;
   a display panel disposed in the casing and adjacent to the light guide plate; and
   a light-guiding member movably disposed in the opening of the casing and comprising a first light-permeable portion, a second light-permeable portion, and at least one non-light-permeable portion, wherein the first light-permeable portion is opposite the second light-permeable portion, the non-light-permeable portion is disposed between the first and second light-permeable portions, when the light-guiding member is moved to a first position, the second light-permeable portion connects to the light guide plate and light in the exterior of the casing enters the light guide plate sequentially via the first and second light-permeable portions, and when the light-guiding member is moved to a second position, the non-light-permeable portion connects to the light guide plate and the light in the exterior of the casing does not enter the light guide plate via the light-guiding member.

2. The display as claimed in claim 1, wherein the non-light-permeable portion comprises a reflective material.

3. The display as claimed in claim 1, wherein the casing further comprises a first positioning groove and a second positioning groove, the light-guiding member further comprises a positioning protrusion, the positioning protrusion is engaged in the first positioning groove when the light-guiding member is moved to the first position, and the positioning protrusion is engaged in the second positioning groove when the light-guiding member is moved to the second position.

4. The display as claimed in claim 1, further comprising a light source disposed in the casing and adjacent to the light guide plate.

5. The display as claimed in claim 1, further comprising a support frame disposed in the casing and supporting the light guide plate.

6. The display as claimed in claim 5, further comprising a reflective film disposed between the light guide plate and the support frame.

* * * * *